US009015755B2

(12) United States Patent
Gupta et al.

(10) Patent No.: US 9,015,755 B2
(45) Date of Patent: Apr. 21, 2015

(54) SYSTEM AND METHOD FOR AN AUTOMATIC TELEVISION CHANNEL CHANGE

(75) Inventors: Shekhar Gupta, Overland Park, KS (US); Curtis Tucker, Lees Summit, MO (US); Robert Morrill, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1327 days.

(21) Appl. No.: 12/181,847

(22) Filed: Jul. 29, 2008

(65) Prior Publication Data

US 2010/0031286 A1    Feb. 4, 2010

(51) Int. Cl.
| | |
|---|---|
| *H04N 7/16* | (2011.01) |
| *G06F 3/00* | (2006.01) |
| *G06F 13/00* | (2006.01) |
| *H04N 5/445* | (2011.01) |
| *H04N 5/50* | (2006.01) |
| *H04N 21/462* | (2011.01) |
| *H04N 21/438* | (2011.01) |
| *H04N 21/45* | (2011.01) |
| *H04N 21/443* | (2011.01) |
| *H04N 21/472* | (2011.01) |
| *H04N 21/475* | (2011.01) |

(52) U.S. Cl.
CPC .............. *H04N 5/50* (2013.01); *H04N 5/44543* (2013.01); *H04N 21/4622* (2013.01); *H04N 21/4383* (2013.01); *H04N 21/4532* (2013.01); *H04N 21/4753* (2013.01); *H04N 21/4436* (2013.01); *H04N 21/47214* (2013.01)

(58) Field of Classification Search
CPC ....................... H04N 21/4383; H04N 21/4583
USPC .................................................. 725/37, 38, 59
See application file for complete search history.

(56) References Cited

U.S. PATENT DOCUMENTS

| | | | |
|---|---|---|---|
| 3,818,352 | A | 6/1974 | Moran |
| 6,101,480 | A | 8/2000 | Conmy et al. |
| 6,760,423 | B1 | 7/2004 | Todd |
| 6,956,623 | B1 | 10/2005 | Staller |
| 6,981,042 | B1 * | 12/2005 | Rey ............................... 709/225 |
| 2002/0147979 | A1 | 10/2002 | Corson |
| 2003/0005462 | A1 | 1/2003 | Broadus et al. |
| 2003/0142809 | A1 | 7/2003 | Coffey |

(Continued)

FOREIGN PATENT DOCUMENTS

| | | |
|---|---|---|
| EP | 1 791 354 | 10/2006 |
| WO | WO 01/95616 | 7/2001 |

OTHER PUBLICATIONS

"Programming Your VCR to Automatically Change Channels to Record a Program", 3 pgs., http://www.comcast.com/images/ImageLibrary/FAQ/PDF/Programming%20Your%20VCR%20to-%20Automaticaly%20Change%20and%20Record%20Channels.pdf.

(Continued)

*Primary Examiner* — Nasser Goodarzi
*Assistant Examiner* — Kyu Chae
(74) *Attorney, Agent, or Firm* — Swanson & Bratschun, L.L.C.

(57) ABSTRACT

A system and method for automatically changing channels. A user selection of a channel and a time associated with media content is received. The current time is determined. A display is powered on in response to determining the display is off. A display is automatically changed to the channel in response to the current time matching the selected time. The media content received through the channel is displayed.

14 Claims, 6 Drawing Sheets

(56) References Cited

U.S. PATENT DOCUMENTS

| | | |
|---|---|---|
| 2004/0223054 A1 | 11/2004 | Rotholtz |
| 2004/0257434 A1 | 12/2004 | Davis et al. |
| 2005/0071427 A1 | 3/2005 | Dorner et al. |
| 2005/0169443 A1 | 8/2005 | Rosenthal |
| 2005/0251826 A1* | 11/2005 | Orr ................... 725/46 |
| 2006/0020993 A1 | 1/2006 | Hannum et al. |
| 2006/0242665 A1* | 10/2006 | Knee et al. ............ 725/38 |
| 2006/0271984 A1* | 11/2006 | Ishihara ............. 725/100 |
| 2007/0083895 A1* | 4/2007 | McCarthy et al. ...... 725/46 |
| 2007/0271582 A1* | 11/2007 | Ellis et al. ............ 725/46 |
| 2007/0277221 A1 | 11/2007 | Davis et al. |
| 2008/0072261 A1 | 3/2008 | Ralston et al. |
| 2008/0165944 A1 | 7/2008 | Rosenthal et al. |
| 2008/0216122 A1* | 9/2008 | Pong et al. ............ 725/46 |
| 2008/0320513 A1* | 12/2008 | Wong et al. ........... 725/38 |
| 2009/0064221 A1* | 3/2009 | Stevens ................ 725/38 |
| 2009/0083788 A1* | 3/2009 | Russell et al. ......... 725/34 |
| 2009/0172758 A1 | 7/2009 | Vantalon et al. |
| 2009/0271827 A1* | 10/2009 | Nejat ................... 725/59 |

OTHER PUBLICATIONS wwwen.zte.com, "IPTV—Building a Bridge through Communication", 3 pgs., copyright 1985-2008 ZTE Corporation.

www.Reuters.com, "Shanghai's Oriental Cable Network Selects Cisco to Deploy First ROADM Networking Technology in Mainland China" 3 pgs., Jan. 17, 2008.

www.sysmaster.com, "Tornado M10 Digital Media Center", 3 pgs., copyright 2001-2008 Sysmaster Corp.

Ishikawa, N. et al, "The design of a set-top box with video encoder and its application to video conferencing", 2 pgs., May 1998 (CAT. INIST).

Whitepapers.zdnet.com, "Cable Network Builds Interactive Television Application on Cutting-Edge Technology", 3 pgs., Aug. 8, 2008.

\* cited by examiner

FIG. 6

```
                          Graphical User Interface              600

Password    ******** 602

604        606        608         610          612         614
    Channel    Station    Program    Time period   Turn TV on?  Priority 3        Family     Cartoons   4:00 - 4:30 PM    No          1
     16        Sports     Baseball   4:00 - 4:30 PM    No          2
     45        Kids       Educational 4:00 - 4:30 PM   No          3
     62        Movie      Pirates    4:30 - 7:30 PM    Yes         1
     89        History    Medieval   7:30 - 8:00 PM    No          1
      8        News       Stock Updates 8:00 - 8:15 PM Yes         1
     29        Comedy     Stand Up   9:00 - 10:00 Pm   Yes         1

Add channel to list 616  ▼           Frequency 618   ▼

Select by program 620              622            624            626
      Program          Channels      Turn TV on?    Turn TV off?

Mythbusters       12, 91, 30       Yes            Yes
     The Simpsons      6, 15, 75        Yes            Yes Add channel to list 628  ▼          Frequency 630  ▼
```

SYSTEM AND METHOD FOR AN AUTOMATIC TELEVISION CHANNEL CHANGE

BACKGROUND OF THE INVENTION

The use of and development of entertainment technologies has grown nearly exponentially in recent years. The growth is fueled by larger communications networks with more reliable protocols and smart devices enabled with cutting edge hardware and software. For example, the distribution of media content through satellite, cable, Internet Protocol television (IPTV), and other communications connections has vastly increased the media options to one or more users.

Despite the improvements in media related technologies, the selection of television programming, video-on-demand (VOD), or other media content has not changed significantly. Typically a user utilizes an electronic or hard copy of a programming guide or schedule to manually change a channel or otherwise select to display media content. The selection is usually made at the time the user watches the content if the user is able to remember the relevant information, such as channel and time.

BRIEF SUMMARY OF THE INVENTION

One embodiment provides a system and method for automatically changing channels. A user selection of a channel and a time associated with media content may be received. The current time may be determined. A display may be powered on in response to determining the display is off. A display may be automatically changed to the channel in response to the current time matching the selected time. The media content received through the channel may be displayed.

Another embodiment provides a media device configured to change channels. The media device may include a user interface to display a menu to a user. The user interface may receive a selection of a channel, a priority, and a time associated with multiple selections of media content from multiple users. The media device may also include a clock to determine a current time. The media device may further include display logic in communication with the user interface and clock. The display logic may select one of the multiple media content selected by the multiple users based on the priority for each of the multiple media content selections. The display logic may change a television to the channel and may allow the media content to be displayed in response to the current time matching the selected time.

Yet another embodiment may provide a method for automatically changing channels. The method may include receiving a user selection of a channel, a time, and a priority associated with media content. A current time may be determined. A media selection with a highest priority may be determined from multiple media selections prioritized by multiple users. A display may be powered on. The display automatically may change the channel associated with the media selection in response to the current time matching the time.

BRIEF DESCRIPTION OF THE DRAWINGS

Illustrative embodiments of the present invention are described in detail below with reference to the attached drawing figures, which are incorporated by reference herein and wherein:

FIG. 6 is a pictorial representation of a graphical user interface for pre-selecting media content in accordance with an illustrative embodiment.

DETAILED DESCRIPTION OF THE INVENTION

An illustrative embodiment provides a system and method for changing channels of a display. The display may be a television, computer monitor, projector, or other display or projection element. For purposes of simplicity, the display may be referred to as a television. The display may alternate between media content based on user preferences and pre-selected content. In one embodiment, the display may be programmed to be turned on to a selected channel at a specified time. Similarly, the display may be configured to turn off the display at the end of a program or media content. As a result, a user may not be required to remember the scheduled time for one or more programs or other media content. Additionally, the display may monitor one or more users viewing habits in order to prioritize media content for display. Any number of priorities based on user profiles or user selections may be used to automatically arbitrate between different factors to display media content for one or more users.

Figure 1:
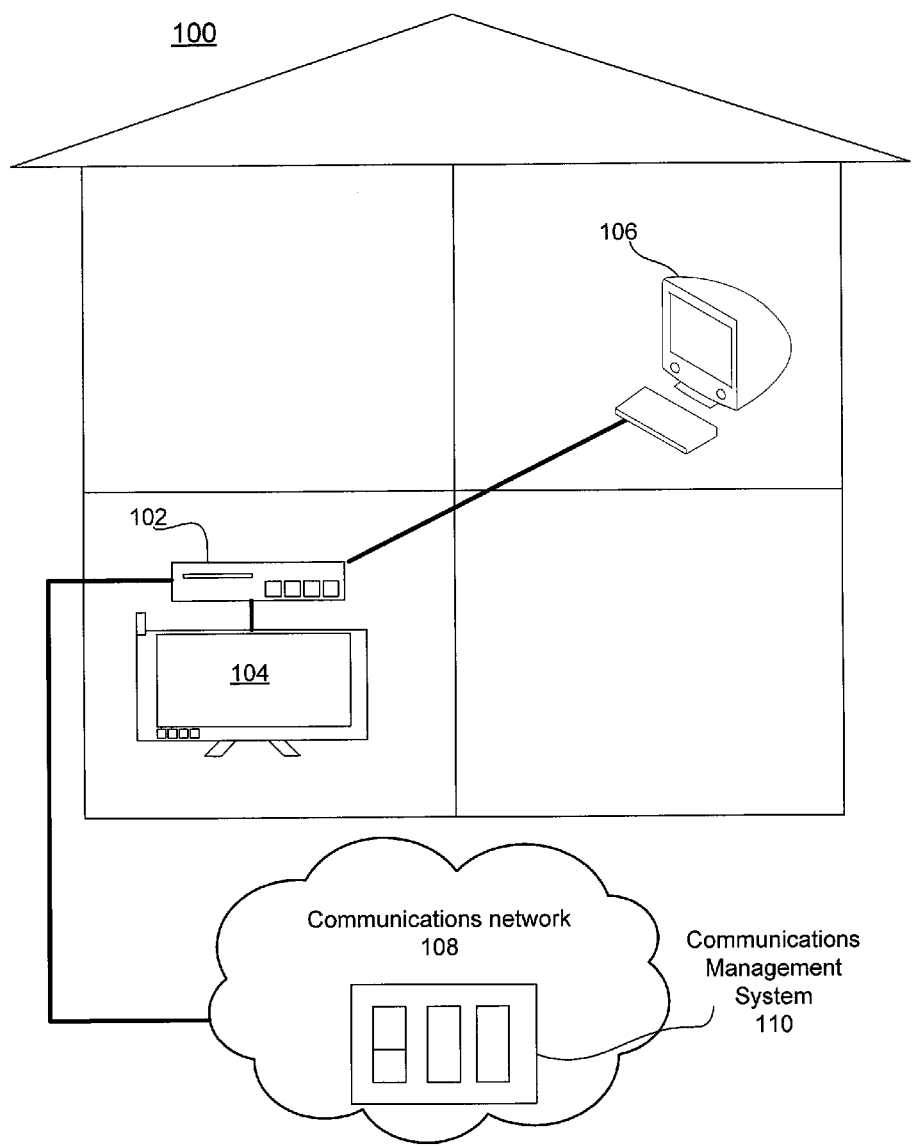
FIG. 1 is a pictorial representation of a user environment in accordance with an illustrative embodiment.

FIG. 1 is a pictorial representation of a user environment in accordance with an illustrative embodiment. The user environment 100 may include a set-top box 102, a television 104, a personal computer 106, and a communications network 108 which may include a communications management system 110.

The set-top box 102 is a device that configures media content for display by interconnected display devices. In one embodiment, the set-top box 102 may function as a receiver, a digital video recorder (DVR), or a personal video recorder for displaying any number of audio, video, or still media content through speakers, the television 104 or other interconnected devices. The set-top box 102 or television 104 may receive and process media signals from a satellite provider, cable provider, DSL connection, Internet Protocol television (IPTV) connection, antenna, or other connections types and/or media content providers.

The set-top box 102 communicates a media content signal to a display. The display is any electronic device configured to visually display video content, images, information, data, and media content, such as a television 104, computer monitor, laptop, projector, personal computer 106, or a wireless device. The set-top box 102 may communicate with the television 104 and the personal computer 106 through a suitable wired or wireless connection. For example, both a high definition multimedia interface (HDMI) or WiFi connection may be utilized between the set-top box 102 and the television 104.

In one embodiment, the television 104 or set-top box 102 may individually or together generate an interactive user interface to implement the automatic channel change feature, mode, or setting as shown in FIG. 6. In another embodiment, the automatic channel change feature may be implemented by the communications management system 110 or another intelligent network device through the communications network 108. In another embodiment, the set-top box 102 may enable the automatic channel change feature itself or through the use of the home computer 106, router, or network device. For example, the set-top box 102 or personal computer 106 may manage a home or business network that may manage the display of media content for a number of televisions. As described, any number of the devices of FIG. 1 may individually or separately be utilized to implement the automatic channel change features.

In another embodiment, the television 104 may be programmed or include hardware or software to allow a user to enable the automatic channel change feature directly from the television 104. For example, a hotel manager may set the automatic channel change feature for the lobby television to be on specific channels so no unwanted content is displayed to the hotel guests.

The personal computer 106 is a computing device linked to a communications network 108. In one embodiment, the personal computer 106 may include a program configured for controlling automatic channel change operations for all entertainment, display, and other computing or communications devices in the user environment 100. The personal computer 106 may communicate with the set-top box 102 or television 104 to implement the automatic channel change feature through the use of suitable wireless or wired connections and the applicable standards or communications protocols. For example, the personal computer 106 may allow a user to customize the channels that are displayed at specific times on a network of televisions from a single location. The ability to manage multiple devices may be especially useful for security purposes. For example, an automatic channel change program on a single personal computer may allow a user to view a network of closed circuit televisions (CCTV) at specified intervals or pre-selected times.

The personal computer 106 may also include a connection to the Internet. A connection to the internet may allow the user to access a web portal that contains options for configuring and implementing the automatic channel change feature for registered displays. The web portal may be generated and managed by the communications management system 110 and include options for configuring and implementing the automatic channel change feature.

The communications network 108 may be comprised of equipment suitable for directing communications to a specified location or device. The communications network 108 may provide a wired or wireless connection to the various devices and elements of the user environment 100. The home, business, or organization of FIG. 1 may further include an internal wireless network, LAN, or other limited network.

The communications network 108 may include a communications management system 110. The communications management system 110 is one or more devices utilized to enable, initiate, route, and manage communications and other streaming media transmitted between one or more media devices. The communications management system 110 may include one or more devices networked to manage the communications network 108. For example, the communications management system may include any number of servers, routers, switches, or advanced intelligent devices. The communications network 108 sends and receives the electronic signals through any number of transmission mediums. The communications network 108 may include various fiber optics, cables, transmission towers, antennas, or other elements for transmitting data communications to the connected media devices. In one embodiment, the communications management system 110 and the communications network 108 work to transmit IPTV. However, the communications network 108 may enable analog connections, wireless service, or other forms of media communications.

The communications management system 110 may include a server configured to store user preferences for an automatic channel change feature. The communications management system 110 may receive user preferences from the connected television 104, the set-top box 102, the personal computer 106, or any other suitable electronic device.

Figure 2:
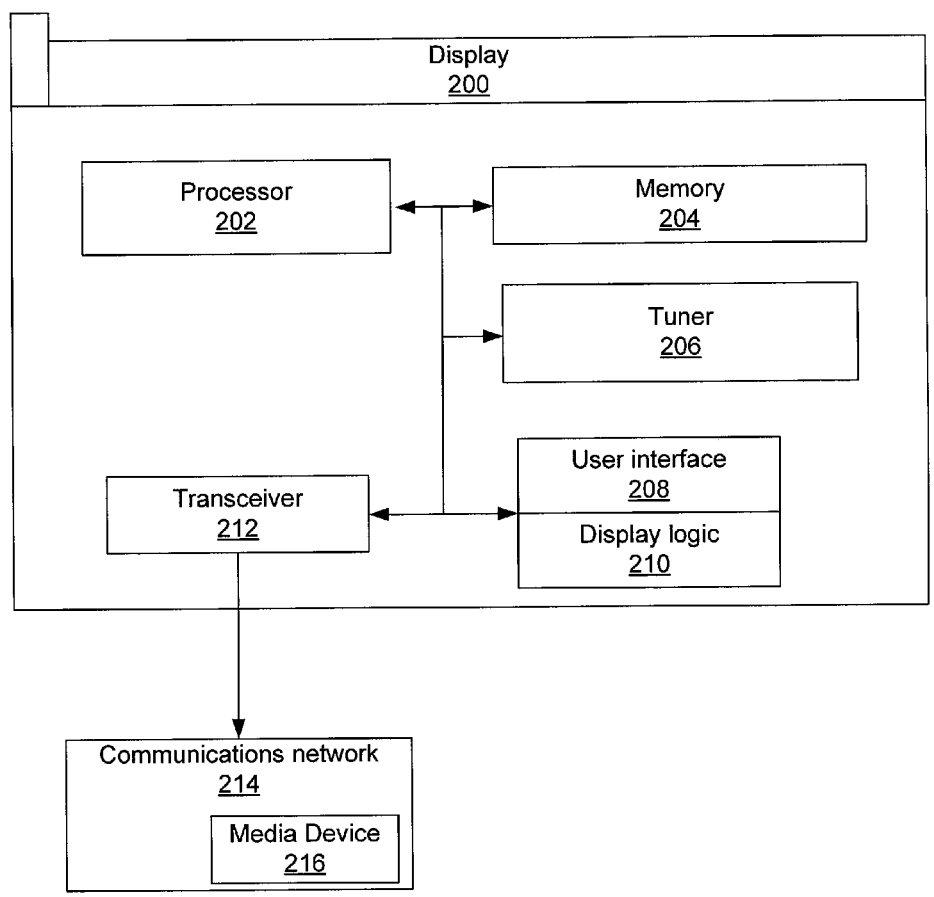
FIG. 2 is a block diagram of a display in accordance with an illustrative embodiment.

FIG. 2 is a block diagram of a display in accordance with an illustrative embodiment. The display 200 may include a processor 202, memory 204, a tuner 206, a user interface 208, display logic 210, and a transceiver 212. The display may communicate with a communications network 214 and a media device 216. The elements and components of the display 200 may also be utilized by a set-top box, personal computer, communications management system, router, or other network device in order to automatically change channels as herein described.

The processor 202 is circuitry or logic enabled to control execution of a set of instructions. The processor 202 may be a microprocessor, digital signal processor, central processing unit, or other device suitable for controlling an electronic device including one or more hardware and software elements, executing software, instructions, programs, and applications, converting and processing signals and information, and performing other related tasks. For example, the processor 202 may execute a module or software application to perform the automatic television channel change. The processor 202 may be a single chip or integrated with other computing or communications elements.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and mediums. The memory 204 may store user preferences to implement an automatic channel change feature. For example, the memory 204 may store times with associated channels, commands to turn a display on or off, priorities, frequencies, and other data to implement an automatic channel change feature on connected displays. Although not described extensively, the display 200 may include any number of DVR elements and features.

The tuner 206 is the circuitry of the display 200 that receives, converts and formats broadcast signals and utilizes user input to display the selected program, channel or media content. The tuner 206 may receive commands stored in memory 204 to change the channel at a specific time to an associated channel. For example, a command signal generated by the display logic 210 based on user preferences may command the tuner 206 to change to a specified channel. The tuner may be controlled remotely or manually. In one embodiment, the tuner 206 may receive and process media content for a plurality of televisions or channels simultaneously.

The tuner 206 may process content received from multiple sources. In one embodiment, the tuner 206 may process or aggregate media content received from multiple sources. For example, the display 200 may receive media content from a cable television provider, a wireless network for a hotel broadcasting relevant hotel and local information on two channels, and a CCTV channel displaying rooftop, pool, and exterior views of surrounding areas.

The user interface 208 is an interactive menu for receiving user input. The user input may specify a channel or media content, a selected time, a series of media content selected for display, and/or power options. In one embodiment, the user interface 208 may be displayed by the display 200 to allow a user to initiate the automatic channel change feature and configure user preferences for the automatic channel change feature. In another embodiment, the user interface 208 may control an interactive voice response system for presenting the user with various options and receiving user input.

The display logic 210 is the hardware and software that implements the automatic channel change feature for one or more displays. In particular, the display logic 210 may be configured to determine if media content has been selected for output by the display 200. The display logic 210 may determine the current date and time and compare the current time information with media content pre-selected by a user. The display logic 210 may determine the channel or source of media content associated with a user selection in order to command the tuner 206 to process the selected media content. In another embodiment, the display logic 210 may send a control signal to one or more displays to power on or off or change to a pre-selected channel. The control signals may be transmitted through the transceiver 212 utilizing a wired or wireless connection. The transceiver is the communications circuitry that enables the display to transmit and receive commands, signals, information, messages, and other data through a wired or wireless connection.

For example, a user may enter the time period when a sporting event will be broadcast and specify that the display logic 212 sends a control signal to activate a television and enable the tuner 206 to process a specified channel when the sporting event begins. In one embodiment, the display logic 210 prevents the changing of channels from an associated channel during a specified time period. For example, the display logic 210 may prevent one or more home televisions from changing channels when the user is watching a specified religious program. By default, the display logic 210 may allow the user to manually change from content automatically selected so that the user is not required to watch media content at any given time.

In another embodiment, the display logic 210 may send automatic channel change commands, messages, or signals to the devices informing the devices to initiate and end the automatic channel change feature. The messages may be sent to individual devices or to a communications management system that manages communications for one or more of the user's devices. For example, a server that enables IPTV communications may prevent channels being changed on all linked displays until a command is received that the channel associated with the current time has changed or been suspended. The display logic 210 may also require a password, user identification, pin number, or other identifier in order to provide user input, change from a pre-scheduled program, or otherwise implement or change the process for implementing automatic channel changes.

The communications network 214 may enable the display 200 to receive media content and communicate with other devices to activate the automatic channel change feature. The communications network 214 may include a personal, home, or business network, as well as, a network enabled by a communications service provider. The media content received by the display 200 may include television programs, VOD, real-time events, video clips, photographs, web pages, interactive content, or other media content. The media device 216 may be a personal computer, set-top box, communications management system, or other device that may also be suitable to send commands to change the content displayed by the display at pre-set times. The display 200 may include a switch or power management system in communication with the display logic 210. The switch may turn the display 200 on or off based on commands from the display logic 210.

In one embodiment, the media content or media selections may be implemented automatically by the display logic 210. For example, the display logic 210 may monitor and record the users viewing habits in order to automatically change the channel to content that is typically watched by the user. The determination may be based on a number of thresholds specified by the user or included by default in the display logic 210. For example, if the user has selected to watch a television program three or more times, the media content may be added as a user selection. In one embodiment, each of the most frequently viewed programs may be prioritized based on the number of times a significant portion of the program was viewed by the user. As a result, if the most frequently viewed content comes on, the display logic 210 may change to the applicable channel or turn on the television. In one embodiment, the user may set preferences for automatically display media content. The viewing habits may be monitored for multiple users and the display logic 210 may arbitrate which media content is displayed based on a number of priorities as further described below.

In another embodiment, the display logic 210 may be configured to receive user input from multiple users. Each user may have a profile that specifies preferences, settings, rules, constraints, and the content the user is authorized to view. For example, children may only be able to view content from 8:00 a.m. to 8:00 p.m. that is rated G or PG or the broadcast equivalent. The user profile may specify a priority or importance level. The priority level for the user may indicate whether the user is given deference over other users. For example, media selections of a parent with a priority level of 1 may be given deference over a child with a priority level of 3. Additionally, each user may assign a priority for each content. For example, the user may specify a level of between one and ten indicating the importance to the user that the selected media content is displayed at each time.

The display logic 210 may include arbitration logic that determines the media content to display when there are multiple media selections that may be concurrently displayed. For example, if a parent and child have selected programs that are displayed at the same time, the determination may be made strictly based on priority level. For example, the child may have rated a media selection a three on a scale of one to ten and the parent may have rated a separate media selection a seven. As a result, the display logic 210 plays the child's selection. However, if the priority level of each user profile is utilized to make the determination, the display logic 210 may determine that the parent has a higher priority level and as a result, the parent's selection is played regardless of the user selected priority levels for the media content.

The display logic 210 may also determine the media content to display based on the time of day. For example, each user may be given preference in the morning, afternoon, night, or early morning based on the user profiles or administrative settings. For example, the child may be given deference in the morning during cartoons, a nanny may be given deference in the afternoon, and parents may be given priority at night and early morning. In one embodiment, the display logic 210 may randomly select media content if the priority levels are equal. Alternatively, a selection matrix may be used to alternate which user's media content is displayed. The selection matrix may correspond to a selected time period, such as a day or week. For example, during the week, each child within a family may be given a turn to select media content if multiple selections have been made for the same time. The foregoing factors may be used in various combinations to determine the selection of media content to display.

Figure 3:
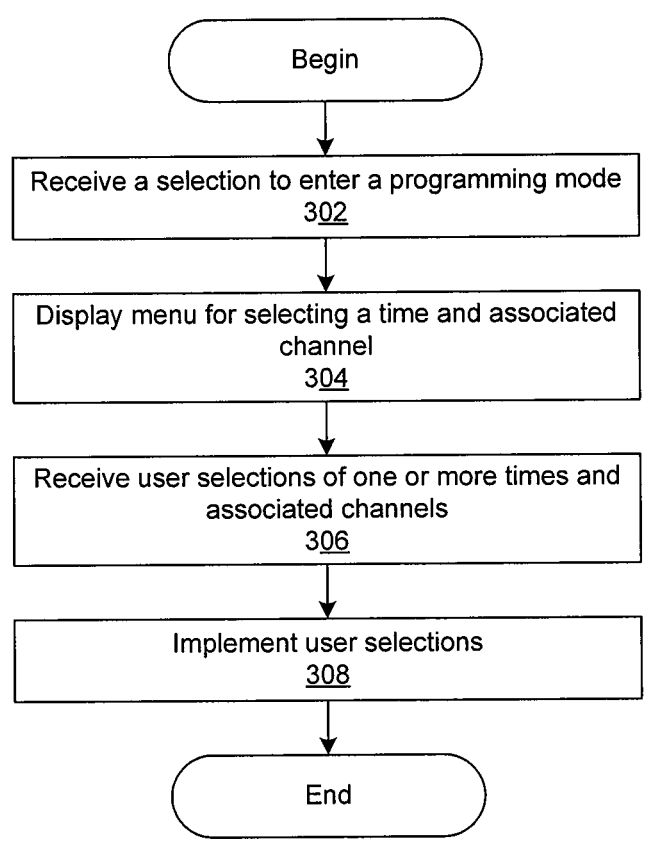
FIG. 3 is a flowchart of a process for receiving user preferences to display media content in accordance with an illustrative embodiment.

FIG. 3 is a flowchart of a process for receiving user preferences to display media content in accordance with an illustrative embodiment. The process of FIG. 3 may be implemented by a television, personal computer, set-top box, or communications management system.

The process may begin with the television receiving a selection to enter a programming mode (step 302). The selection may be user input received directly through the television, through a remote control, a web portal, or other user interface.

Next, the television may display a menu for selecting a time and associated channel (step 304). The menu may present any number of options for selecting the media content and selected time. In one embodiment, the television program guide may present options that allow a user to pre-configure television channel changes. The menu may also allow a user to select a specific series or shows without selecting each individual show or program.

Next, the television may receive user selections of one or more times and associated channels through the menu (step 306). In one embodiment, the menu may present a timeline or schedule for displaying media content to clarify the user selections. For example, a restaurant owner may pre-select a number of programs known to be popular with the patrons for the entire day that is displayed to the restaurant owner in a time line for each day of the week. In another embodiment, the programming guide may allow a user to simply select an icon, selection box, or other interactive element in order to change to the media content at the appointed time.

In another embodiment, the user may also specify a priority for each selection. In one embodiment, the priority may be number one through three, one being the highest or most important and three being the lowest. If two events are scheduled at once, the media content with the highest priority is played. Additionally, user profiles may be utilized to ensure that the selections of certain users have a higher priority other than other users. For example, the mother of a home may have a priority level of one for media content that she selects, the family's children have a priority level of two, and the father of the home has a priority level of three because of his tendency to monopolize the television.

Next, the television may implement the user selections (step 308). The television may implement multiple user selections for a specified amount of time a day, week, month, or year. The television may implement the user selections by saving the commands, instructions, settings, or preferences for execution at the specified time or based on receipt of specified media content.

Figure 4:
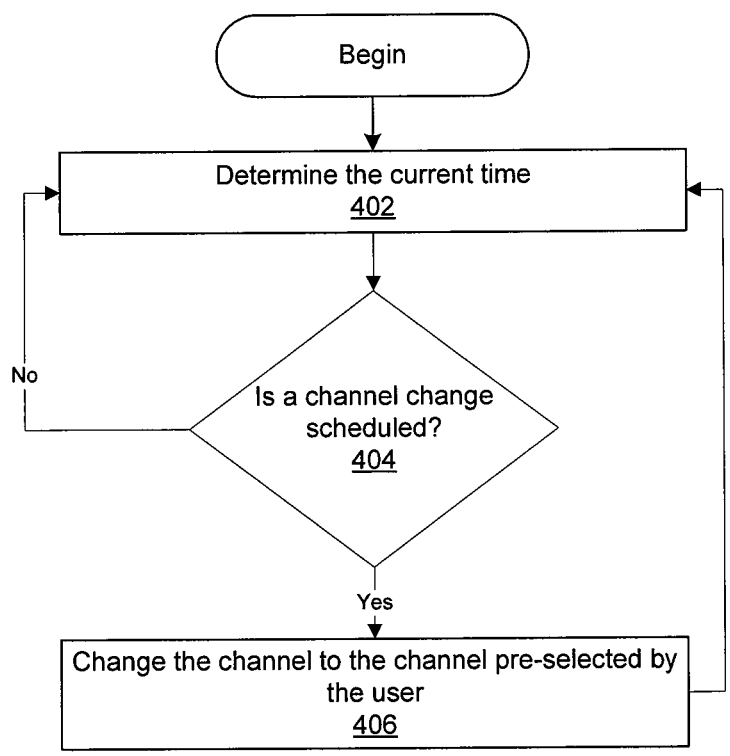
FIG. 4 is a flowchart of a process for automatically changing channels in accordance with an illustrative embodiment.

FIG. 4 is a flowchart of a process for automatically changing channels in accordance with an illustrative embodiment. The process of FIG. 4 may be implemented by a display. As previously described, the display may be a television, computer monitor, or other display element and may implement the process internally or based on signals from an external device.

The process may begin by determining the current time (step 402). The display may determine the current time by utilizing a built in clock or through an externally connected device or network connection.

Next, the display determines whether a channel change is scheduled (step 404). The determination of step 404 may be made based on user input, settings, or preferences. The user may pre-select any number of channels, programs, or other media content corresponding to a selected channel that is shown by the display at a pre-selected time. If the display determines a channel change is not scheduled, the display determines the current time (step 402).

If the display determines a channel change is scheduled in step 404, the display changes the channel to the channel pre-selected by the user (step 406). For example, the user may have indicated that at 5 PM the display is to automatically change to channel 8 displaying the NAC news and at 7 PM the display is to change to channel 32 displaying the sports show "Experts vs. couch potatoes".

Next, the display again determines the current time (step 402). The process of FIG. 4 may be repeated any number of times or continuously for programs, channels, and content selected by the user. As a result the display continuously alternates between pre-selected content. At any time the user may provide a manual selection to override the previously made selections. In one embodiment, a user may be required to provide a code, password, or other identifier to override the pre-selected channel changes. Additionally, if a priority number is assigned to media content or one or more users accessing the display, the media content with the highest priority is displayed.

Figure 5:
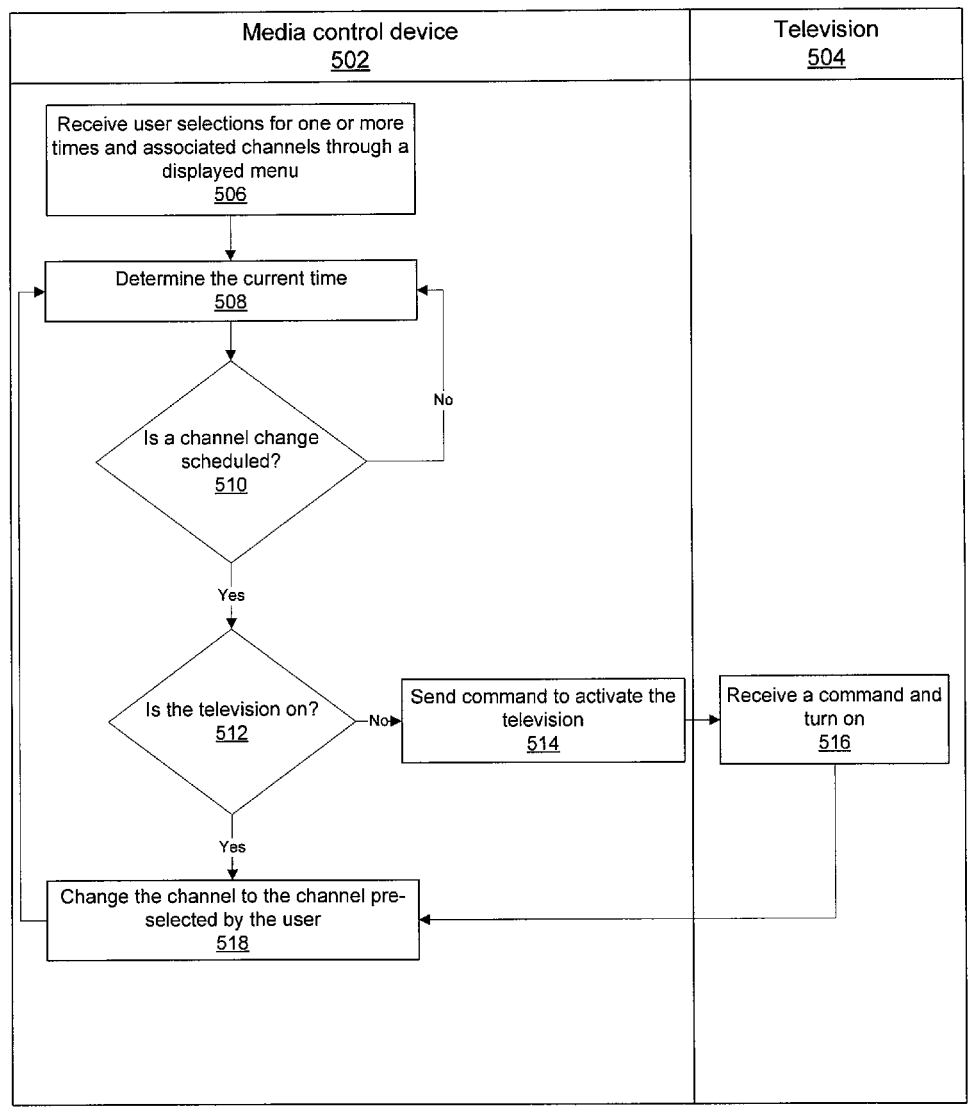
FIG. 5 is a flowchart of a process for automatically activating a display and changing channels in accordance with an illustrative embodiment.

FIG. 5 is a flowchart of a process for automatically activating a display and changing channels in accordance with an illustrative embodiment. The process of FIG. 5 may be implemented by a media control device 502 and a television 504. As previously described, the media control device 502 may be a set-top box, personal computer, or communications management system. The process of FIG. 5 may be simultaneously implemented for any number of televisions or displays by one or more media control devices.

The process of FIG. 5 may begin with the media control device 502 receiving user selections for one or more times and associated channels through a displayed menu (step 506). The menu used to make selections of times and associated channels may include any number of options and interactive elements. The media control device 502 may determine the current time (step 508). The media control device 502 may determine the current time by utilizing a built in clock, logic, or through an externally connected device or network connection.

Next, the media control device 502 determines whether a channel change is scheduled (step 510). The determination of step 510 may be made based on user input, settings, or preferences. The user may pre-select any number of channels, programs, or other media content corresponding to a selected channel for display by the television 504 at an associated time. If the media control device 502 determines a channel change is not scheduled, the media control device 502 determines the current time (step 508).

If the media control device 502 determines a channel change is scheduled in step 510, the media control device 502 determines whether the television 504 is on (step 512). If the television 504 is on, the media control device 502 changes the channel to the channel pre-selected by the user (step 518) before returning again to step 508. For example, a hotel manager may pre-select the channels for the day to automatically display channels that will follow local sports teams for flat screen televisions mounted in the lobby.

If the media control device 502 determines that the television is not on in step 512, the media control device 502 may send a command to activate the television (step 514). The command to activate the television may be sent through any suitable connection as previously described.

Next, the television 504 may receive a command and turn on (step 516). The command to turn the television 504 on at a specified time may also include a command to turn the television 504 off. For example, a user may only wish to view an educational program. The user may select the channel the program will be broadcast on and enter the times that the television is to be turned on and turned off.

After the television 504 is turned on (step 516) it may change the channel to the channel pre-selected by the user (step 518) before returning again to step 508. The process of FIG. 5 may be repeated any number of times or continuously for programs, channels, and content selected by the user. As a result the media control device 502 continuously alternates between pre-selected content. At any time, the user may provide a manual selection to override the previously made selections. In one embodiment, a user may be required to provide a code, password, or other identifier to override the pre-selected channel changes.

FIG. 6 is a pictorial representation of a graphical user interface for pre-selecting media content in accordance with an illustrative embodiment. FIG. 6 illustrates one embodiment of a graphical user interface 600 that may include an authentication space 602 and selection elements 604, 606, 608, 610, 612, 614, 616, 618, 620, 622, 624, 626, 628, and 630. In another embodiment, the user interface 600 may be controlled by a user utilizing an interactive voice response system. The graphical user interface 600 may be generated and displayed by any number of devices including a set-top box, television, computer monitor, laptop, personal computer, or wireless device. The user interface 600 may receive user input and user preferences for implementing the automatic channel change feature for a single event or for a series of events.

The authentication space 602 is a identification verifier. The authentication space 602 may allow a user to prevent others from making changes to the automatic channel change settings. The authentication space 602 may require a user to enter a username, password, or any other suitable identifier. For example, requiring a password before being able to make changes to the automatic channel change settings may allow a parent to limit the channels children will be able to view and the amount of time.

The selection elements 604, 606, 608, 610, 612, 614, 616, 618, 620, 622, 624, 626, 628, and 630 are any number of icons, buttons, portions of a touch screen, text boxes, drop down menus, or other interactive elements that may be used to receive user input and selections and display applicable information. As illustrated in FIG. 6, the channel and program are one example of media content. The selection elements 604, 606, 608, and 610 may allow a user to choose what channel may be associated with a time, what station the channel is broadcast from, and what program may be broadcast at the selected time. For example, a user may select channel 3 using selection element 604, selection element 606 may then display the station broadcasting channel 3, and selection element 608 may display the program broadcast by the station. A user may also begin by selecting the station or program to be viewed which may then provide a channel or list of channels the user may use to view the desired station or programs.

The selection element 610 may allow a user to specify a time period to be associated with a channel or media content. For example, a parent may specify that from 4:00 to 4:30 PM a channel broadcasting cartoons may be associated with the time period. A parent may also choose multiple channels to associate with the time period to allow their children to have several channel choices. A child may then change between the associated channels without having to provide a password or other identifier.

The selection element 612 may allow a user to choose to activate or turn on the television at the beginning of the selected time period. In another embodiment, the selection element 612 may also be used to turn the television off as well.

The selection element 614 may allow a user to assign a priority to channels associated with a time. The channel with the highest priority may be automatically displayed, but a user may also be able to view channels with lower priorities. For example, if multiple users or channels have been simultaneously selected, the media content with the highest priority is selected for display. In another embodiment, when a commercial is being played on the channel with the highest priority the display may automatically change to the channel with the next highest priority and switch back to the channel with the highest priority when the commercial has ended.

The selection element 616 may allow a user to add a channel to the list of channels used with the automatic channel change feature. Adding channels may allow a user to only view the most often viewed channels and avoid scrolling through the list of all available channels.

The selection element 618 may allow a user to determine the frequency of the automatic channel change feature. A user may select the channels that may be viewed for a single day, on weekdays only, weekends, or any other custom frequency. For example, a user may want to see stock updates before going to bed each weekday. The user may select the desired time, frequency, and channel to view stock updates.

The selection element 620 may allow a user to select a program to associate with the automatic channel change feature. Selecting a program using selection element 602 may populate a list of channels that broadcast the program that may be approved, selected or modified by the selection element 622. The user may select all the channels or single channel to avoid repetition.

Selection elements 624 and 626 may turn the television on or off. In another embodiment, the selection elements 624 and 626 may be combined to a single selection element. For example, a user may specify that anytime the selected program comes on channels 2, 6, or 10, the television automatically turns on when the program begins and turns off when the program ends.

Selection element 628 may allow a user to add a channel to the list of channels that display the selected program. For example, a user may think that the selected program only comes on satellite channels and then finds out the program also comes on local channels. The selection element 628 may allow the user to add the local channel to the list of channels that broadcast the selected program. Selection element 630 may allow a user to determine the frequency of the automatic channel change feature. For example, a user may only want to watch the selected program on Thursdays when new episodes are broadcast.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for automatically changing channels, the method comprising:
   receiving a first user selection from a first user comprising the identification of a first specific television program and further comprising an approval from the first user of one or more channels selected from an automatically populated list of channels that broadcast the first specific program;

receiving a second user selection from a second user comprising the identification of a second specific television program and further comprising an approval from the second user of one or more channels selected from an automatically populated list of channels that broadcast the second specific program;

determining a relative priority from among the first specified television program and the second specified television program;

automatically tuning the display to the one of the first specified television program and the second specified television program having the highest determined priority; and displaying the one of the first specified television program and the second specified television program having the highest determined priority.

2. The method according to claim 1, wherein the highest priority includes determining a priority level that grants viewing deference to the first user over the second user.

3. The method according to claim 1, further comprising:
preventing a changing of channels during the displaying of the one of the first specified television program and the second specified television program with the highest priority.

4. The method according to claim 3, further comprising:
receiving the user selections through a web portal.

5. The method according to claim 1, wherein the steps are enabled to be performed by a set-top box, television, and a communications management system.

6. The method according to claim 1, wherein the user selections are automatically determined by a set-top box utilizing viewing history on the display.

7. The method according to claim 1, further comprising:
receiving user input to override the user selections; and
recording the one of the first specified television program and the second specified television program in response to the user selections being overridden.

8. A media device configured to change channels, the media device comprising:
a user interface operable to display a menu to first and second users, the user interface operable to receive a selection of a first specific television program from the first user and the selection of a second specific television program from the second user, and a corresponding priority for each of the first and second specific television programs, the user interface being further configured to automatically populate a list of one or more channels that broadcast the first specific television program and receive an approval from the first user of one or more approved channels selected from the automatically populated list of channels that broadcast the first specific program, the user interface being further configured to automatically populate a list of one or more channels that broadcast the second specific television program and receive an approval from the second user of one or more approved channels selected from the automatically populated list of channels that broadcast the second specific program; and display logic in communication with the user interface and the clock, the display logic operable to:
determine that the first and second specific programs are being broadcast;
determine a relative priority from among the first specified program and the second specified program;
automatically tune the display to the one of the first specified program and the second specified program having the highest determined priority; and
display the one of the first specified program and the second specified program having the highest determined priority.

9. The media device of claim 8, further comprising:
a power control configured to turn on the television in order for the display logic to change the channel.

10. The media device according to claim 8, wherein the media device is any of a television, a set-top box, and a communications management system.

11. The media device according to claim 8, further comprising:
a transceiver operable to send a command to the television to change to the channel to display the one of the first specified program and the second specified program having the highest determined priority.

12. The media device according to claim 8, further comprising:
changing the channel during commercials to a second channel displaying the one of the first specified program and the second specified program with a next highest priority.

13. The method according to claim 1, further comprising:
recording the one of the first specified program and the second specified program having the lower determined priority for playback at a later time.

14. The method according to claim 1, further comprising:
randomly selecting the one of the first specified program and the second specified program in response to the priority being equal for each of the one of the first specified program and the second specified program.

* * * * *